United States Patent [19]

Benz

[11] 4,279,001
[45] Jul. 14, 1981

[54] IMAGE READOUT DEVICE WITH ELECTRONICALLY VARIABLE SPATIAL RESOLUTION

[75] Inventor: Harry A. Benz, Newport News, Va.

[73] Assignee: The United States of America as represented by the Administrator of the National Aeronautics and Space Administration, Washington, D.C.

[21] Appl. No.: 135,039

[22] Filed: Mar. 28, 1980

[51] Int. Cl.³ .............................................. H04N 5/30
[52] U.S. Cl. ................................................. 358/213
[58] Field of Search ................. 358/213, 212; 310/322

[56] References Cited

U.S. PATENT DOCUMENTS 4,053,934 10/1977 Kornreich et al. .................. 358/213

Primary Examiner—Robert L. Richardson
Attorney, Agent, or Firm—Howard J. Osborn; John R. Manning; William H. King

[57] ABSTRACT

This invention relates to the use of a standing acoustic wave charge storage device 11 as an image readout device. A frequency $f_1$ 22 is applied to the storage transfer device to create a traveling electric field in the device in one direction along a straight line. A second frequency $f_2$ 23 which is a harmonic of $f_1$, has the same amplitude as $f_1$, and is phase stable with $f_1$ is applied to the charge transfer device to create a traveling electric field in the opposite direction to the first traveling electric field. Consequently, a standing wave (FIG. 2) is created in the charge transfer device along the straight line. When an image 25 is focused on the charge transfer device, light is stored in the wells of the standing wave. Thereafter when the frequency $f_2$ is removed from the device, the standing wave tends to break up (FIG. 3) and the charges stored therein are moved to an electrode 18 which is connected to an output terminal 19. This terminal is connected to a utilization device 28 where the received charges represent the image on the surface of the charge transfer device along a projection of said straight line.

8 Claims, 4 Drawing Figures

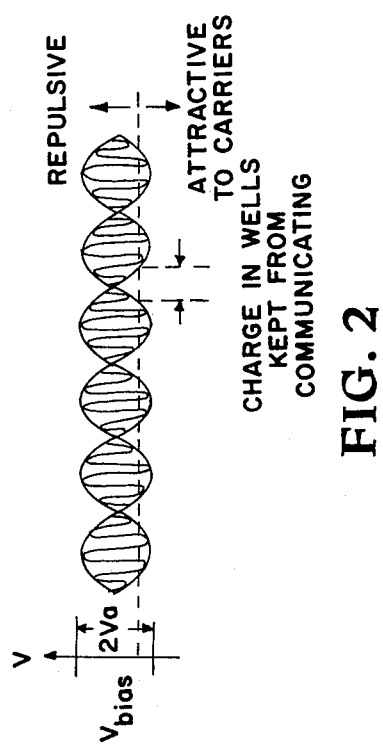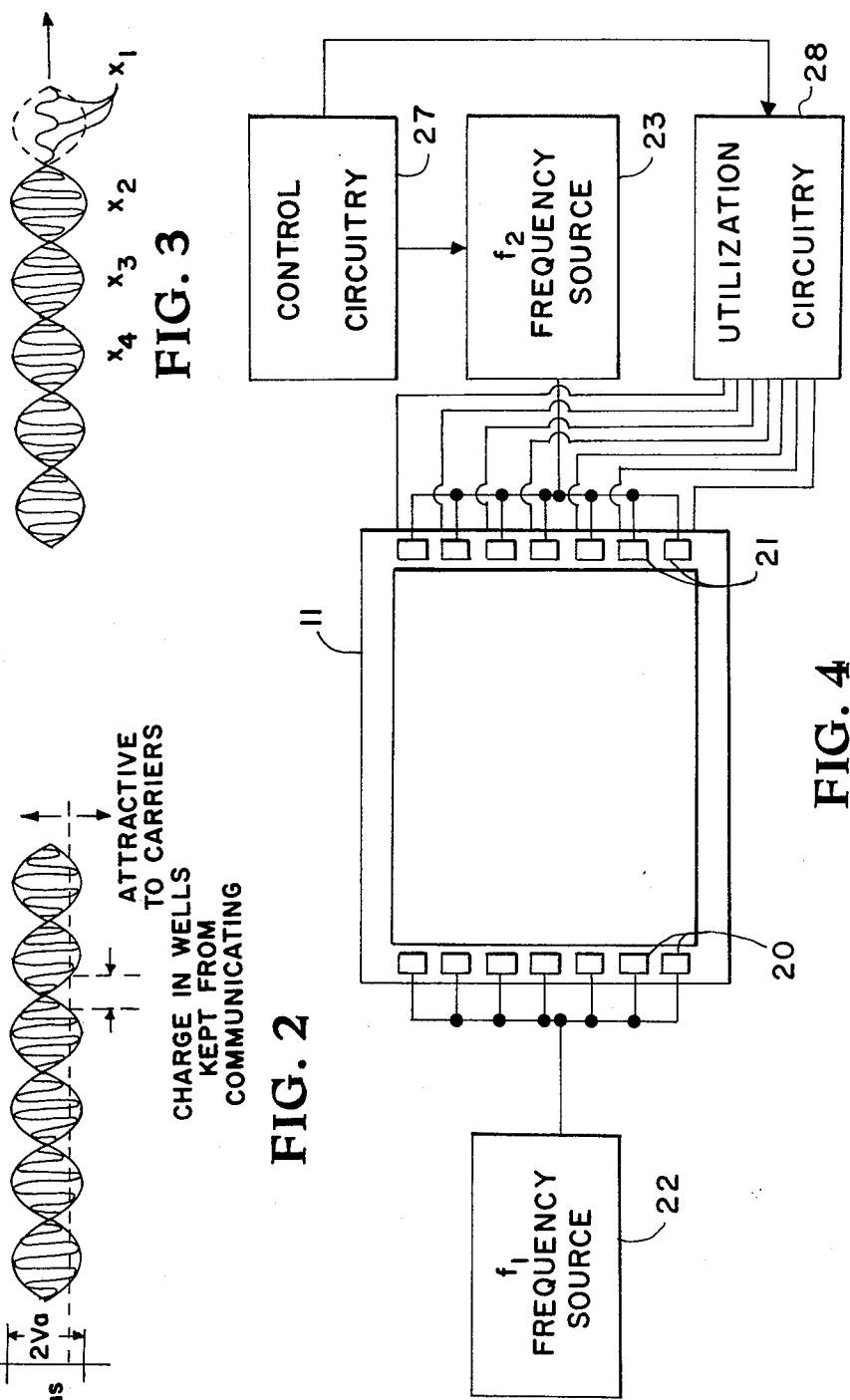

IMAGE READOUT DEVICE WITH ELECTRONICALLY VARIABLE SPATIAL RESOLUTION

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to a surface acoustic wave (SAW) charge transfer device (CTD) and more specifically concerns the use of a surface acoustic wave charge transfer device as an image readout device in which the spatial resolution of the readout device can be changed by electronic means.

In a surface acoustic wave charge transfer device, surface acoustic waves are used to create traveling longitudinal electric fields in the device. These traveling electric fields create potential wells which will carry along charges that may be stored in the wells. The charges can be injected into the wells by means of light.

It is the primary purpose of the invention to use a surface acoustic wave charge transfer device as an image readout device in which the spatial resolution can be varied by electronic means.

SUMMARY OF THE INVENTION

In the present invention several surface acoustic wave charge transfer devices are constructed side by side on a monolithic substrate such that the traveling longitudinal electric fields created in the substrate are in evenly spaced straight lines parallel to each other. Each of the charge transfer devices is fed by signal having a first frequency to create traveling electrical fields along the straight lines in one direction. The charge transfer devices are also fed by a signal having a second frequency such that the resulting traveling longitudinal electrical fields created in the charge transfer devices are along the straight lines in the opposite direction. The second frequency signal is a harmonic of the first frequency signal, has the same amplitude as the first frequency signal, and is phase stable with respect to the first frequency signal. As a result of these traveling longitudinal electric fields bucking each other along each of the straight lines, standing waves are formed which have a frequency equal to the difference in the frequencies of the first and second frequency signals. Consequently, when light strikes the device, charges are stored in the wells of the standing waves. Thereafter, the second frequency signal is removed from the device causing the standing wave to break up and then the traveling longitudinal electric field caused by the first frequency signal tends to push the charges through the device. An electrode for each standing wave is appropriately located so these charges can be removed from the device and applied to a utilization circuit. The magnitude and time location of each charge are indicative of the intensity of the light and the spatial location of that intensity. Inasmuch as the second frequency can be changed and still maintain the required relationship with the first frequency, the second frequency can be changed to thereby change the spatial resolution of the device.

BRIEF DESCRIPTION OF THE DRAWINGS

FIG. 2 is a drawing of the standing wave created in the charge transfer device;

FIG. 3 is a drawing of the standing wave created in the charge transfer device immediately after one of the signals is removed from the device; and FIG. 4 is a block diagram of the invention with a top view of the charge transfer device.

DETAILED DESCRIPTION OF THE INVENTION

Figure 1:
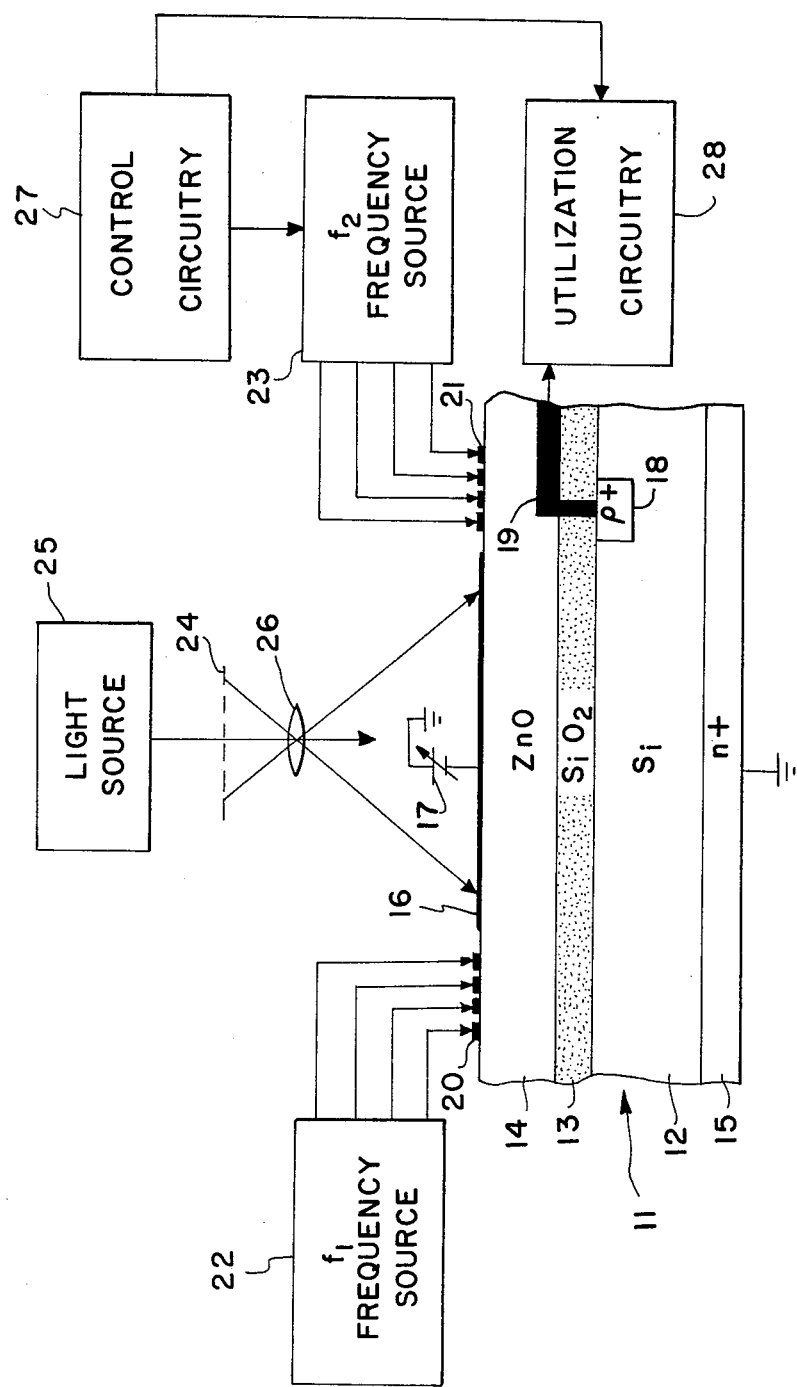
FIG. 1 is a block diagram of the invention with a cross-sectional view of the charge transfer device used.

Turning now to the embodiment of the invention selected for illustration in the drawings the number 11 in FIG. 1 designates a cross-sectional view of a surface acoustic wave charge transfer device. The charge transfer device 11 includes a n-type silicon substrate 12, a thermally grown silicon dioxide layer 13, and a sputtered film 14 of piezoelectric ZnO. An electrode 15 which is connected to ground is deposited on the substrate 12. A transparent metallic biasing plate 16 is deposited on layer 14 and is connected through a variable voltage 17 to ground. The presence of the biasing plate 16 enhances the acoustoelectric potential at the silicone dioxide interface, thus resulting in a more efficient device. A charge detecting diode 18 is located in layer 12 and connected to a terminal 19.

The charge transfer device 11 is excited by interdigital transducers 20 and 21 which are placed on the surface of layer 14. An $f_1$ frequency source 22 is applied to interdigital transducer 21 which, as is well known, produces a traveling electric field along a straight line in the silicon substrate 12. An $f_2$ frequency source 23 is applied to interdigital transducer 21 to produce a second traveling field opposite to the one produced by interdigital transducer 20. The frequency $f_2$ is a harmonic of the frequency $f_1$, has the same amplitude as the frequency $f_1$ and is phase stable with respect to $f_1$. Consequently, a standing wave such as that shown in FIG. 2 is produced in substrate 12. The frequency of this standing wave is equal to the frequency $f_1$ minus the frequency $f_2$.

An object 24 is illuminated by a light source 25 such that a lens system 26 forms an image of the object on the surface of charge transfer device 11. This image causes charges to be stored in the potential wells of the standing wave shown in FIG. 2. Biasing plate 16 provides a d.c. bias necessary for the nodes of the standing wave to confine the collected charges. Whenever the frequency source 23 is disconnected from the interdigital transducer 21 the standing wave tends to break up as shown in FIG. 3. That is, the standing wave nearest the interdigital transducer 21 breaks up first, then the next one, and so on until the complete standing wave has broken up. As the standing wave is being broken up, the traveling electric field produced by $f_1$ pushes the charges released by the standing wave in the direction of diode 18. Hence, after $f_2$ is removed, the packet of charges $x_1$ are first applied to the diode 18, then the charges $x_2$ are applied to the diode and so forth. It can therefore be readily seen that the charges $x_1, x_2, x_3, \ldots$ represent the image along a straight line between interdigital transducers 20 and 21. The standing wave collapses to the traveling wave from $f_1$ at the piezoacoustic velocity of the wave in the medium. A control circuitry 27 disconnects the frequency source 23 from the interdigital transducer 21 and also provides a signal to a utilization circuitry 28 to determine the relative times of the signals received by the utilization circuitry 28 from electrode 18.

FIG. 4 shows the top view of the device in FIG. 1 in which several interdigital transducers 20 are driven by the single frequency source 22 and several interdigital transducers 21 are driven by the single frequency source 23. This can be done as long as the channels and the detecting diodes are suitably separated.

The advantage of this invention is that it provides means for changing the spatial resolution of an image readout device by electronic means. That is, the spatial resolution of the output of the device can be controlled by changing the frequency of frequency source 23.

It is to be understood that the form of the invention herewith shown and described is to be taken as a preferred embodiment. Various changes may be made in the device without departing from the invention. For example, changes in frequency at either side will change the spatial resolution of the standing wave and therefore the equivalent detector resolution as long as the amplitude and phase reqirements of the acoustic waves are maintained. Also, the structure could easily extend to the second dimension by using an additional pair of surface acoustic wave structures in the y-direction, also driven at harmonically related frequencies in matching amplitudes to define the standing wave in the y-direction, which will effectively separate the x-direction channels in much the same way as the barrier diodes or overlaying geometry. Similarly, a y-direction resolution variation with clocking could be achieved by changing the harmonic relation between the traveling waves. Thus by changing in driving in a dynamic way the resolution of the sensor in both directions could be changed by clocking only.

What is claimed is:

1. In an image readout device, a detector for detecting light at discrete points along a straight line comprising:
    a surface acoustic wave charge transfer device which in response to a frequency source produces a traveling longitudinal electric field in the device that creates potential wells which carry charges that are injected into the wells by light that strikes the device;
    a first means for applying a frequency $f_1$ to said charge transfer device for producing a first traveling longitudinal electric field in the device along said straight line;
    a second means for applying a frequency $f_2$ to said charge transfer device for producing a second traveling longitudinal electric field in the device along said straight line in the direction opposite to the electric field produced by said first means;
    wherein $f_2$ is a harmonic of $f_1$, has the same amplitude as $f_1$ and is phase stable with $f_1$, whereby the first and second traveling longitudinal fields produce a standing wave along said straight line that has a frequency equal to the difference of $f_1$ and $f_2$;
    means for applying an image to said device whereby light charges are stored in the wells of said standing wave;
    means for disconnecting $f_2$ from said device whereby said standing wave breaks up and the charges stored in the wells of said standing wave are moved along said straight line by the first traveling longitudinal electric field; and
    electrode means included with said charge transfer device receiving the charges moved along said straight line by the first traveling longitudinal electric field.

2. In an image readout device, a detector according to claim 1 wherein said acoustic wave charge transfer device comprises an n-type semiconductor substrate; an insulating layer and a piezoelectric layer.

3. In an image readout device, a detector according to claim 2 including an electrode on the side of said substrate opposite said silicon dioxide layer, a conductive transparent bias plate on the film of piezoelectric ZnO and means for applying a voltage to the bias plate.

4. In an image readout device, a detector according to claim 1 including means for varying the frequency of $f_2$ whereby the spatial resolution of the charges received by said electrode means is varied.

5. In an image readout device, a detector according to claim 1 including circuit means connected to said electrode means for utilizing the resulting multiplexed signals at the electrode means.

6. An image readout device comprising:
    a surface acoustic wave charge transfer device which in response to a frequency source produces a traveling longitudinal electric field in the device that creates potential wells which carry charges that are injected into the wells by light that strikes the device;
    a first means for appylying a frequency $f_1$ to said charge transfer device at n different locations for producing n first traveling longitudinal electric fields in the device along n straight lines that are parallel to each other;
    a second means for applying a frequency $f_2$ to said charge transfer device at n different locations for producing n second traveling longitudinal electric fields in the device along said n straight lines in the direction opposite to the electric fields produced by said first means;
    wherein $f_2$ is a harmonic of $f_1$, has the same amplitude as $f_1$ and is phase stable with $f_1$, whereby the first and second traveling longitudinal fields produce n standing waves along said n straight lines that have a frequency equal to the difference of $f_1$ and $f_2$;
    means for applying an image to said device whereby light charges are stored in the wells of said standing waves;
    means for disconnecting $f_2$ from said device whereby said standing waves break up and the charges stored in the wells of said standing waves are moved along said straight lines by the first traveling longitudinal electric fields; and
    n electrode means included with said charge transfer device for receiving the charges moved along said n straight lines by the first traveling longitudinal electric fields.

7. An image readout device according to claim 6 wherein said acoustic wave charge transfer device comprises an n-type semiconductor substrate, an insulating layer and a piezoelectric layer.

8. An image readout device according to claim 7 including circuit means connected to said n electrode means for utilizing the resulting multiplexed signals at the n electrode means.

* * * * *